Nov. 15, 1927.  1,648,912
J. F. O'CONNOR
FRICTION SHOCK ABSORBING MECHANISM
Filed March 27, 1925
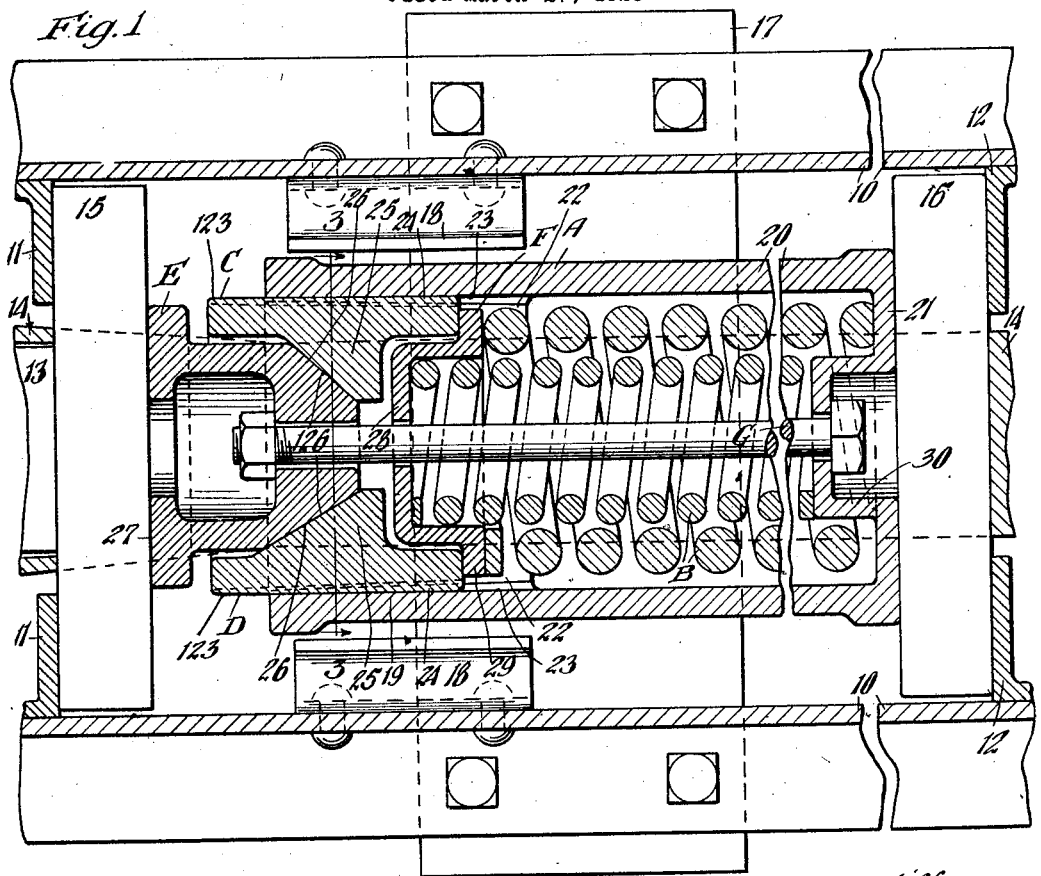
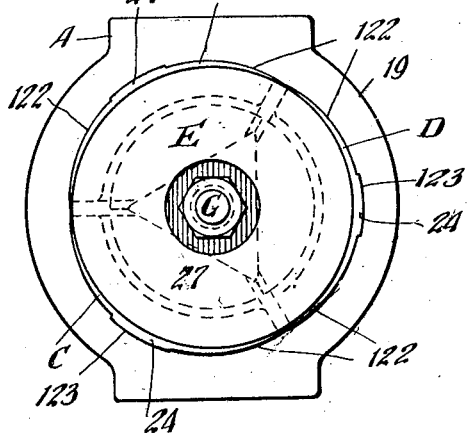
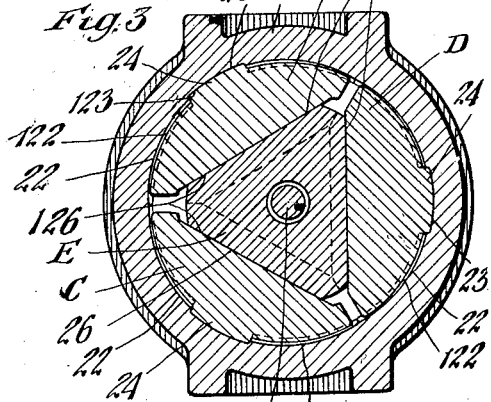
Witness
Wm. Geiger
Inventor
John F. O'Connor
By George I. Haight
His Atty.

Patented Nov. 15, 1927.

1,648,912

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 27, 1925. Serial No. 18,658.

This invention relates to friction shock absorbing mechanisms.

One object of the invention is to provide a high capacity friction shock absorbing mechanism, especially adapted for railway draft riggings, including a plurality of relatively movable friction elements, said elements having co-operating friction surfaces operative in sequence to develop a certain amount of preliminary frictional resistance followed by relatively high frictional resistance during the remainder of the compression stroke.

A more specific object of the invention is to provide a friction shock absorbing mechanism of the character indicated, including a friction shell having two sets of friction surfaces and a friction system co-operating therewith having a plurality of longitudinally disposed friction shoes each having a set of friction surfaces co-operating with the shell friction surfaces, certain of said co-operating surfaces being disposed preferably parallel to the longitudinal axis of the mechanism and others of which diverge longitudinally of the mechanism, whereby a relatively light initial frictional resistance is had, followed by a heavier frictional resistance.

Other objects and advantages of the invention will more fully and clearly appear from the description and claims hereinafter following.

In the drawings forming a part of this specification, Figure 1 is a longitudinal, sectional view of a portion of a railway draft rigging, showing my improvements in connection therewith, the section through the friction elements and wedge corresponding to two sectional planes intersecting at an angle of 120°. Figure 2 is a front end elevational view of the shock absorbing mechanism proper. And Figure 3 is a vertical, transverse, sectional view corresponding substantially to the line 3—3 of Figure 1.

In the drawings, 10—10 indicate the usual channel-shaped draft or center sills of a railway car underframe, to the inner faces of which are secured front stop lugs 11—11 and rear stop lugs 12—12. The inner end portion of the draw-bar is indicated at 13, the same being operatively associated with a hooded yoke 14 of well-known form. The shock absorbing mechanism proper, as well as a front main follower 15 and a rear main follower 16, is operatively disposed within the yoke. The yoke and parts contained therein are supported in operative position by a detachable saddle plate 17. As illustrated, the shock absorbing mechanism is of that type employing a substantially cylindrical shell and spring cage, and in order to maintain the latter in central position, suitable guide plates 18—18 are secured to the inner faces of the draft sills.

The shock absorbing mechanism proper, as shown, comprises broadly, a combined friction shell and spring cage casting A; a spring resistance B; three wedge friction shoes C, C and D; a central wedge E; a spring follower cap F; and a retainer bolt G.

The combined friction shell and spring cage casting A is of substantially cylindrical form throughout its length, with the friction shell proper 19 formed at the front or outer end thereof, and the spring cage proper 20 rearwardly thereof. The casting has a transverse, rear vertical wall 21 which bears directly on the front face of the rear follower 16. The interior of the friction shell 19 is provided with three independent, cylindrical friction surfaces 22—22, converging inwardly of the shell and preferably so arranged that the rear ends of the surfaces 22 will merge, forming a complete true circle. Each of the friction surfaces 22 is cut away at the central portion thereof to provide a longitudinally disposed friction surface 23. The friction surfaces 23 are also of true cylindrical shape and are disposed parallel to the axis of the mechanism.

The three friction shoes C, C and D are of like construction, except as hereinafter pointed out. Each of the shoes C, C and D is provided with outer, longitudinally disposed friction surfaces 122, 122 and 123, the friction surface 123 being disposed between surfaces 122. The surfaces 122 on opposite sides of the friction surface 123 are of true cylindrical contour and co-operate with one of the friction surfaces 22 of the shell. As clearly shown in Figure 1, the surfaces 122 of the three shoes converge inwardly of the mechanism. Each shoe is provided with a longitudinally disposed projection or rib 24 on which the friction surface 123 is formed, the friction surface 123 also being of true cylindrical shape and co-operating with the corresponding friction surface 23 of the friction shell. The friction surfaces 123 of the three shoes are disposed parallel to the axis of the mechanism. On the inner side, that is, the side nearest and adjacent the longitudinal axis of the mechanism, each shoe has a lateral projection 25 provided with a front wedge face 26. The wedge faces 26 of the shoes C are preferably disposed at a relatively blunt releasing angle with reference to the longitudinal axis of the mechanism, and the wedge face 26 of the shoe D is disposed at a relatively keen wedge-acting angle with reference to said axis.

The wedge E, as shown, is in the form of a cast block, suitably cored, having a flat front face 27 and three rearwardly converging wedge faces 126—126 arranged around the axis of the mechanism and adapted to co-act respectively with the faces 26 of the shoes C, C and D, and correspondingly inclined thereto. The flat front face of the wedge bears directly on the inner surface of the main follower 15.

The spring follower F is in the form of a cup-shaped cap, having a forwardly extending section 28 provided with a laterally projecting, heavy annular flange 29 at its inner end adapted to engage the rear ends of the friction shoes C, C and D. The annular flange 29 is engaged on the opposite side thereof by the forward end of the outer heavy coil of the spring resistance B. The light inner coil of the spring resistance has its forward end seated in the cup-shaped section 28 of the spring follower E. The rear ends of the outer and inner coils of the spring resistance B respectively bear on the rear wall 21 of the spring cage casting A and a hollow boss 30 integral with said rear wall and inwardly projecting therefrom.

The overall length of the mechanism is maintained by the retainer bolt G which is anchored at its front and rear ends to the wedge block E and spring cage casting respectively, the head of the bolt being seated within the boss 30 of the spring cage and the nut of the bolt being disposed within the cored opening of the wedge block E. The retainer bolt is preferably of such a length and is so adjusted as to maintain the spring B under initial compression.

In the normal position of the parts, as shown in Figure 1, the friction surfaces 23 and 123 of the friction shoes and shell are in contact, while the friction surfaces 122 and 22 are in slightly spaced relation.

Assuming an inward or buffing movement of the drawbar, the operation of my improved mechanism is as follows: During the rearward movement of the drawbar, the front follower 15 will be moved rearward toward the follower 16, carrying the wedge block E therewith and forcing the friction shoes into intimate contact with the friction surfaces 23 of the shell and carrying the shoes inwardly against the resistance of the spring B. Due to the parallel relation of the friction surfaces 23 of the shell, comparatively light resistance will be offered during this stage of the operation. This action will continue until the converging friction surfaces 122 of the shoes are brought into engagement with and slide inwardly on the friction surfaces 22 of the shell. Due to the converging relation of the friction surfaces 22, the shoes C and D will be forced inwardly toward the axis of the mechanism during the remainder of the compression stroke, thereby augmenting the friction resistance offered by differential action of shoes and wedge. This action will continue until the actuating force is reduced or the front follower is arrested by engagement with the front end of the friction shell, whereupon the pressure will be transmitted directly through the shell to the rear follower and rear stop lugs, the shell acting as a solid column to transmit the pressure and preventing the springs from being driven solid. During draft, the operation will be substantially the reverse of that just described, the front follower 15 being held stationary while the rear follower and shell are moved toward the same.

Release of the mechanism is greatly facilitated due to the blunt and keen angle arrangement of the co-acting wedge faces of the wedge and friction shoes, and also by the outwardly diverging friction surfaces 22—22 of the shell. The blunt faces act in the manner of a "safety valve" to prevent sticking of the elements of the wedge system.

As will be evident to those skilled in the art, by properly proportioning the parts, the amount of preliminary light action and the time of change from this action to the heavier final frictional resistance can be regulated as desired. It will also be evident that my invention is not limited to disposing the set of friction surfaces which first becomes operative in parallel relation to the axis of the mechanism, it being within the invention to dispose all of the friction surfaces at an inclination to the longitudinal axis, the surfaces first becoming operative being inclined to a lesser degree than the remaining surfaces.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction shell;

of a plurality of friction shoes within the shell, said shoes and shell having a plurality of sets of friction surfaces, the surfaces of each set being arranged to operate in sequence to successively provide initial frictional resistance and final relatively heavier frictional resistance during the compression stroke; means for forcing the friction shoes against the friction surfaces of the shell and moving said shoes longitudinally of the shell including a rigid wedge block directly receiving the actuating force and having a plurality of wedge faces co-operating respectively with said shoes; and means yieldingly resisting movement of said shoes.

2. In a friction shock absorbing mechanism, the combination with a friction shell having a plurality of sets of interior friction surfaces; of a plurality of friction shoes movable relatively to the shell, each shoe having a set of friction surfaces co-operating with one of the sets of friction surfaces of the shell, certain of said co-operating surfaces of said last named sets being disposed parallel to the axis of the mechanism, and the remaining co-operating surfaces thereof being inclined to said axis; a unitary rigid wedge pressure transmitting means directly receiving the actuating force and co-operating with said shoes; and a main spring resistance co-operating with the shoes.

3. In a friction shock absorbing mechanism, the combination with a friction shell having a plurality of sets of interior friction surfaces the surfaces of each set being inclined with reference to each other; of a plurality of friction shoes within the shell, each shoe having a set of friction surfaces co-operating with one of the sets of friction surfaces of the shell; a unitary rigid wedge pressure transmitting element directly receiving the actuating force and co-operating with the shoes; and a main spring resistance within the shell opposing movement of the shoes.

4. In a friction shock absorbing mechanism, the combination with a friction shell having a plurality of interior, inwardly converging friction surfaces and additional interior friction surfaces disposed parallel to the axis of the mechanism; of a plurality of friction shoes, each having friction surfaces co-operating with one of said first and one of said second named friction surfaces of the shell; a main spring resistance within the shell opposing movement of the shoes; and unitary rigid wedge pressure transmitting means directly receiving the actuating force and co-operating with the shoes.

5. In a friction shock absorbing mechanism, the combination with a friction shell having a plurality of interior longitudinally disposed friction surfaces, adjacent surfaces thereof being disposed at an angle to each other lengthwise of the mechanism; of a plurality of friction shoes each having friction faces angularly disposed with reference to each other, and co-operating with similarly disposed friction surfaces of the shell; a unitary wedge-pressure transmitting means having a plurality of wedge faces fixed with reference to each other and co-operating with the shoes, said means directly receiving the actuating force and means yieldingly opposing movement of said shoes.

6. In a friction shock absorbing mechanism, the combination with a friction shell; of a plurality of friction shoes within the shell, each shoe having a cylindrical friction surface co-operating with a similar friction surface on the interior of the shell, said co-operating surfaces being inclined with respect to the axis of the mechanism, and each shoe having an additional cylindrical friction surface co-operating with an additional interior cylindrical friction surface of the shell, said last named co-operating surfaces being disposed parallel to the axis of the shell; a unitary wedge block having wedge faces co-operating with said shoes, said wedge block directly receiving the actuating force and means yieldingly resisting movement of said shoes.

7. In a friction shock absorbing mechanism, the combination with a friction shell having a plurality of interior, longitudinally extending friction surfaces disposed at different distances from the center line of the mechanism; of a plurality of friction shoes movable longitudinally with respect to said shell and friction surfaces, said shoes being provided with friction surfaces disposed also at different distances from the center line of the mechanism, certain of said surfaces co-acting during the initial portion of a compression stroke, and the remainder of said surfaces co-acting during the final portion of the compression stroke; a main spring resistance; and a wedge block through which the actuating force is directly transmitted, having a plurality of wedge faces fixed with reference to each other and co-operating with said shoes to effect the longitudinal movement thereof and maintain the friction surfaces thereof in contact with the friction surfaces of the shell.

8. In a friction shock absorbing mechanism, the combination with a column-acting friction member having two sets of friction surfaces extending in the general direction of length of said member, the surfaces of one set being of lesser area than those of the other set, the said friction surfaces of lesser area being arranged at a lesser angle with respect to the axis of the mechanism than the surfaces of the other set; of a spring resistance; a plurality of friction shoes, said shoes being provided each with a plurality of friction surfaces adapted to co-operate successively first with shell friction surfaces of lesser area, and then with shell friction surfaces of greater area; and pressure-transmitting wedge-acting means having wedge faces thereon fixed with relation to each other and co-operable with said shoes for effecting lateral spreading action and longitudinal movement of the latter with respect to said friction member, said means directly receiving the actuating force.

In witness that I claim the foregoing I have hereunto subscribed my name this 23rd day of March, 1925.

JOHN F. O'CONNOR.